July 22, 1941.  C. F. CHISHOLM  2,250,125
APPARATUS USEFUL IN MEASURING ENGINE PERFORMANCE
Filed Feb. 26, 1935 4 Sheets-Sheet 2
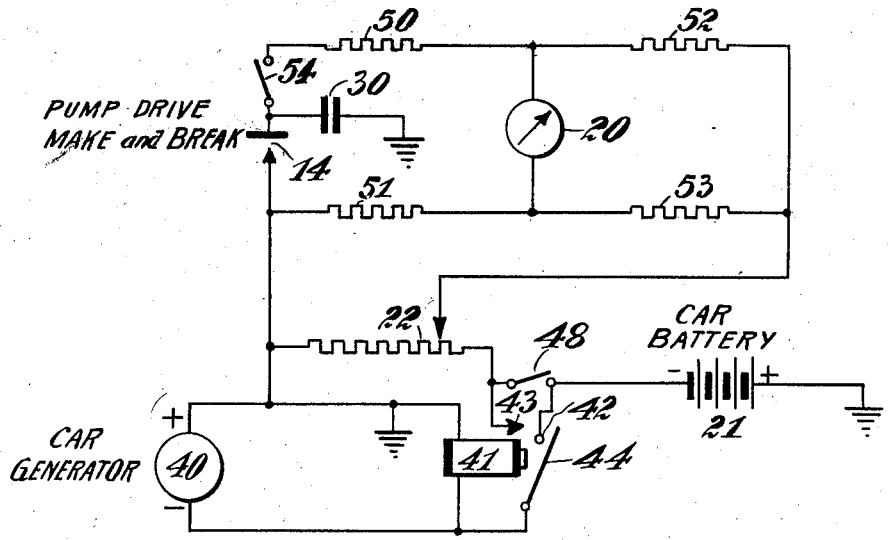
Fig. IV.
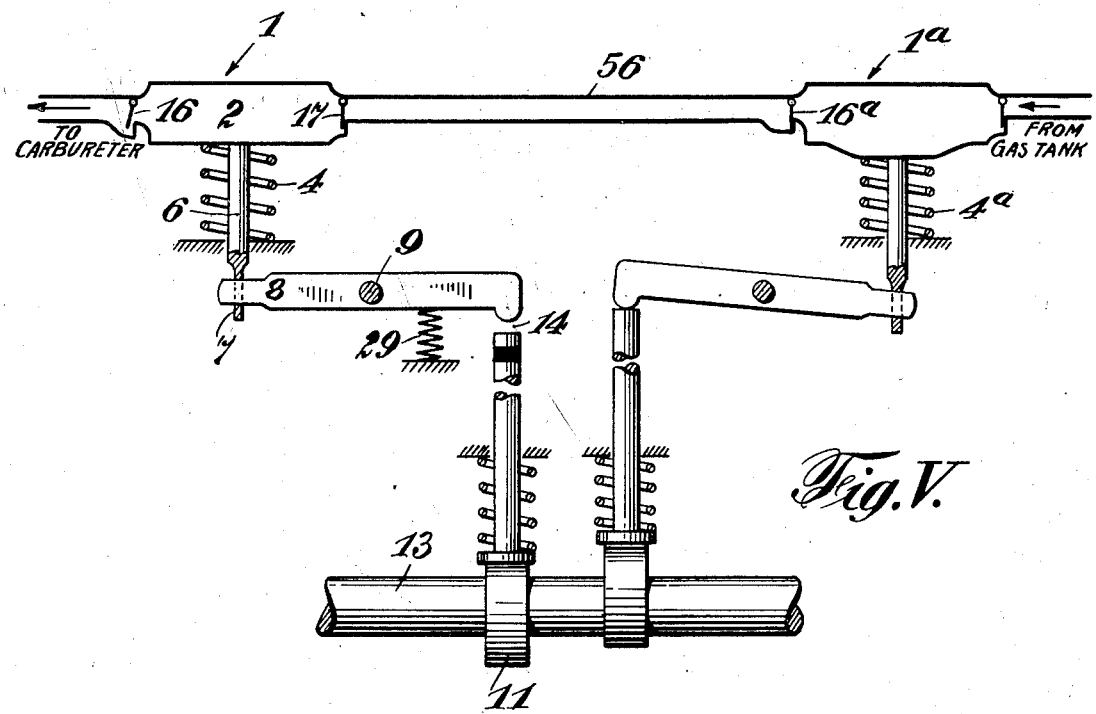
Fig. V.
INVENTOR.
Charles F. Chisholm

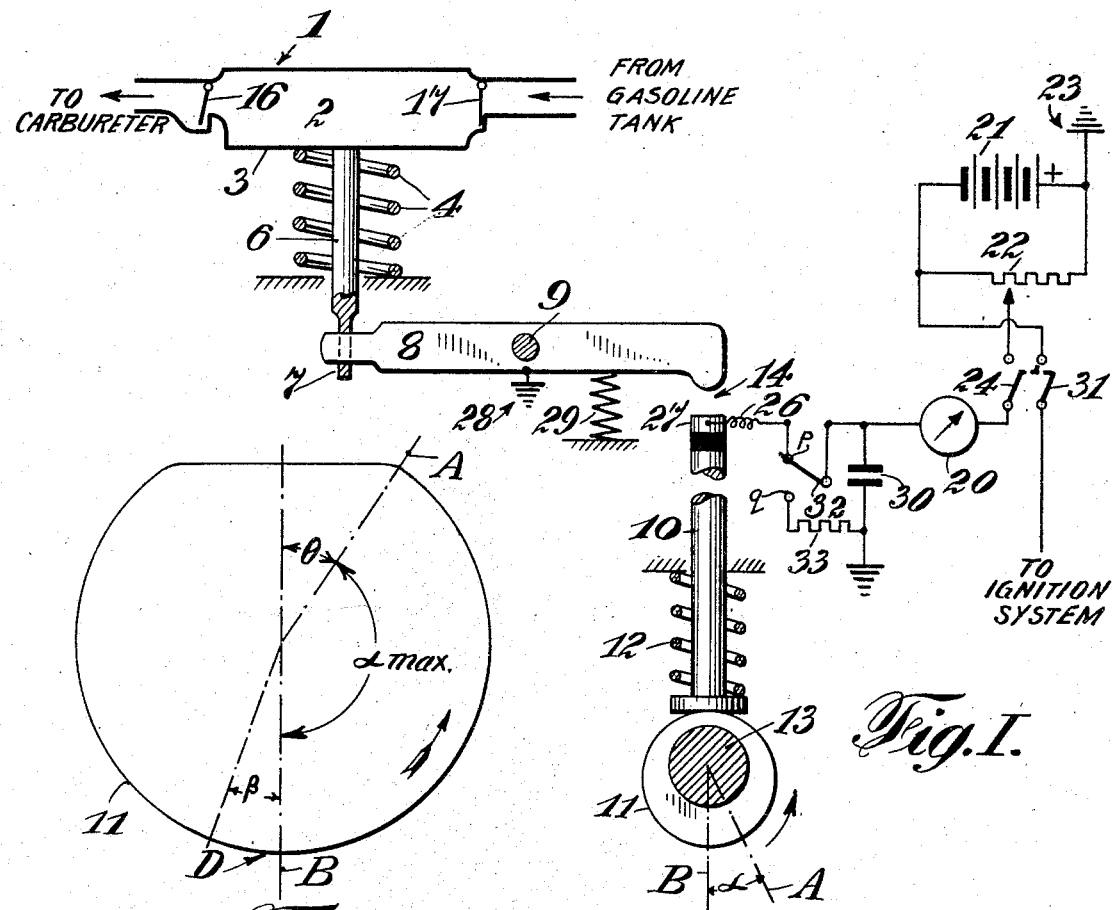
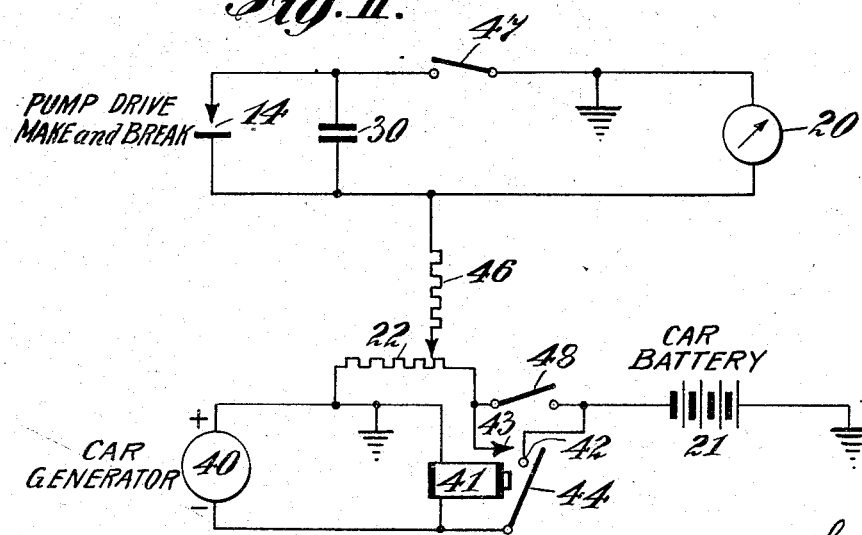

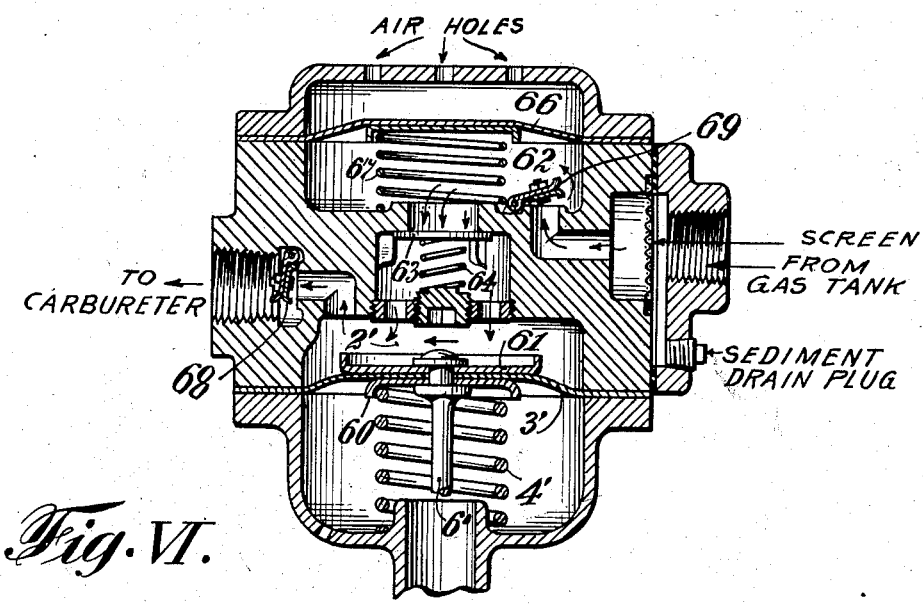

July 22, 1941.                C. F. CHISHOLM                2,250,125
                APPARATUS USEFUL IN MEASURING ENGINE PERFORMANCE
                       Filed Feb. 26, 1935            4 Sheets-Sheet 4
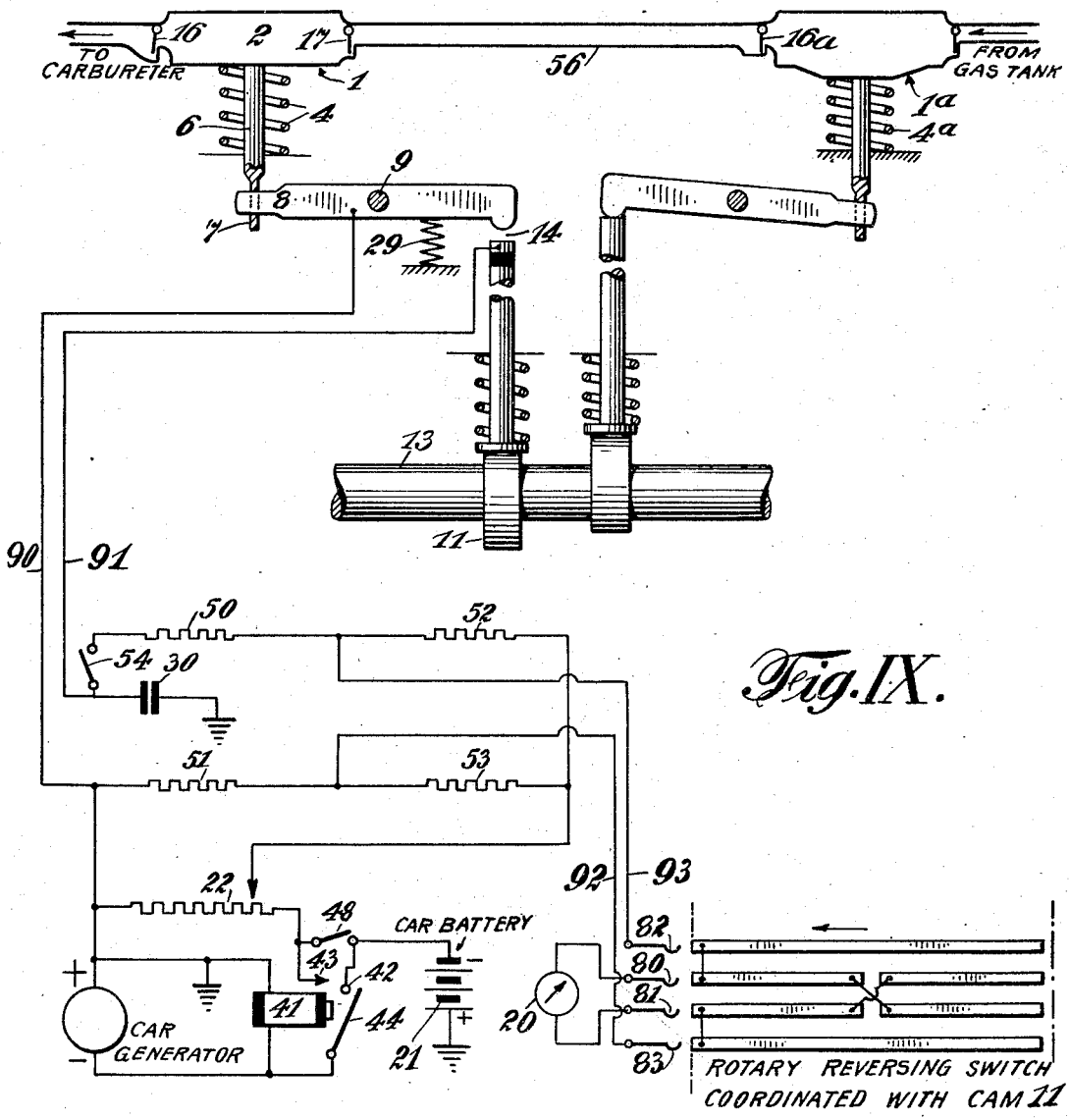
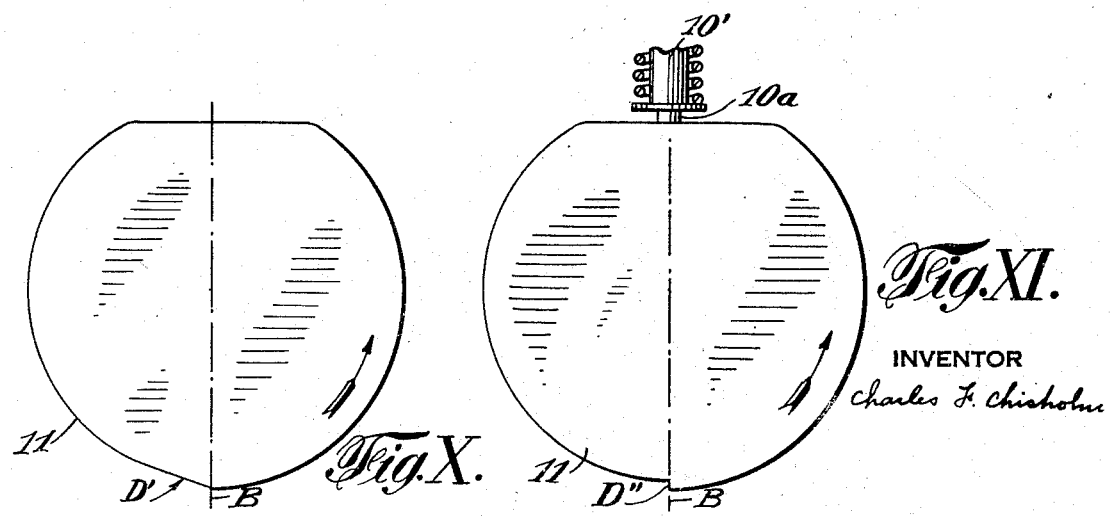
INVENTOR
Charles F. Chisholm Patented July 22, 1941

2,250,125

UNITED STATES PATENT OFFICE 2,250,125

APPARATUS USEFUL IN MEASURING ENGINE PERFORMANCE

Charles F. Chisholm, Sparta, N. J.

Application February 26, 1935, Serial No. 8,246

14 Claims. (Cl. 73—51)

The disclosure herein is specifically an apparatus for giving a running indication of the rate of fuel consumption of an automobile engine. In its broader aspects, however, the invention is applicable to the determination of engine efficiency and also to the determination of the performance of certain engine components or auxiliary equipment, such as (for example) the fuel pump. Embraced within the invention are certain improvements in the feeding of fuel to the engine.

A general object of the invention is to provide an improved apparatus for determining the performance of an internal combustion engine.

Another object of the invention is to provide an improved apparatus for giving a running indication of the engine performance while the engine is in service.

A more specific object of the invention is to provide a practical apparatus for indicating continuously, to an automobile driver, the rate of fuel consumption of his engine, the indication being in terms of either miles per gallon or gallons per mile, as desired.

Various specific objects relating to certain aspects of the invention, or to particular phases of the invention, will be apparent from the following disclosure of several illustrative forms. Quite a number of forms of the invention are now known to me, but the illustrative ones disclosed herein, in compliance with the patent statutes, seem at present to be the best ones for commercial use and practical operation.

In the systems disclosed the fuel is fed to the engine by a variable stroke pump operating in fixed coordination with the engine. The pump is actuated by constant stroke driving means which is effective upon the pump for only a fraction of the driving means cycle, the fraction depending upon the fuel requirements of the engine. The rate of fuel consumption is indicated by an electric meter of the galvanometer type, e. g., a suitable volt meter hereinafter referred to as a "meter." This meter is so connected with the pump driving means that it is given a resultant energization which is in accordance with the division of the driving means cycle into fractions which are effective and ineffective on the pump. Thus, if suitable coordination is effected and suitable precautions are taken, the resultant energization of the meter is a measure of the fuel fed per pump stroke. In an automobile the pump being discussed makes a fixed number of strokes per mile (in high gear, or any other one gear). Accordingly, the meter which measures the fuel fed per pump stroke, may be calibrated directly in either miles per gallon or gallons per mile, as desired. If it is desired to read the meter while the car is operating in gears other than high gear, additional scales may be provided on the meter for the other car gears.

The resultant energization of the meter in accordance with the division of the cycle of the pump driving means into effective and ineffective portions may be accomplished in various ways. One of the ways disclosed is to impress upon the meter successive energizing pulses, each corresponding to the fraction of the pump-drive cycle which is effective on the pump. Another way disclosed is to impress upon the meter successive energizing pulses, each corresponding to the fraction of the pump-drive cycle which is ineffective on the pump. A third way disclosed is to impress upon the meter pulses which are alternately in opposite directions, the pulses in one direction corresponding to the effective fractions of the pump-drive cycle and the pulses in the other direction corresponding to the ineffective fractions of the pump-drive cycle. Each of these three ways of energizing the meter gives the meter a different calibration, but in each case the resultant energization of the meter is in accordance with the division of the pump-drive cycle into effective and ineffective fractions; and the meter may be calibrated directly in either miles per gallon or gallons per mile.

Means other than an electric meter may be used to indicate the division of the pump-drive cycle into effective and ineffective fractions (or the like); but all such means now known to me present practical difficulties not involved with the electric meter systems herein disclosed, and hence do not now seem to be as practical as the electric meter systems.

Fig. I is a diagrammatic view, showing the meter energized by pulses corresponding to the effective fractions of the pump-drive cycle.

Fig. II is an outline of the pump-drive cam, shown to facilitate a discussion of desirable cam shapes.

Fig. III is a schematic diagram showing the meter energized by pulses corresponding to the ineffective fractions of the pump-drive cycle.

Fig. IV is a schematic diagram showing the meter energized by pulses which are alternately in opposite directions, corresponding respectively to the effective and ineffective fractions of the pump-drive cycle.

Fig. V is a diagrammatic view, showing one means which may be used to obtain more appropriate volumetric efficiency of the pump being metered.

Fig. VI is a partially diagrammatic vertical section showing a pump to give good volumetric efficiency.

Fig. VII is a schematic diagram showing meter switching means which may be used with the forms of the invention shown in Figs. I, III and IV to compensate for varying volumetric efficiency of the pump.

Fig. VIII is a diagrammatic isometric view of a meter which will sufficiently compensate for voltage variations in the source used to energize the system.

Fig. IX shows the structure of Figs. IV, V, and VII electrically connected together in operative relationship.

Figs. X and XI are cam diagrams showing modifications of the cam shown in Fig. II.

Gasoline is pumped from the tank (usually at the rear of the car) to the carbureter of the engine by a well known form of fuel pump shown diagrammatically at 1. This pump has a pump chamber 2, the bottom of which is a flexible edged diaphragm 3 that is biased upwardly by a helical spring 4. Attached to the diaphragm 3 is a depending rod 6, the lower portion of which is flattened at 7 and pierced by the end of a lever 8, which is pivotally mounted at 9. A push rod 10 is adapted to be reciprocated by a cam 11 and is held against the cam by suitable means such as a helical spring 12. The cam 11 is driven by the engine in fixed coordination therewith; and in some automobiles now on the market, the shaft 13 which carries the cam is the usual engine cam shaft.

A cycle of pump operation will be traced, starting with the parts in some such position as shown in Fig. I. As cam 11 rotates, the push rod 10 rises, first closing the gap at 14. After the gap has been closed, the remaining portion of the push rod ascent swings lever 8 and draws the diaphragm 3 downwardly. As the diaphragm 3 descends, check valve 16 closes, valve 17 opens, and gasoline is sucked from the gasoline tank into pump chamber 2. The diaphragm 3 reaches its lowermost position when the high spot of cam 11 (intersected by line B) is in engagement with the push rod 10. From that position, continued movement of the cam permits push rod 10 to descend, thereby opening gap 14. Diaphragm 3 is then acted on only by spring 4, which places the fuel in chamber 2 under pressure. Accordingly check valve 17 closes and such amount of fuel is fed to the carbureter as it will take. The carbureter (not shown) has the usual float chamber and float controlled check valve; so the carbureter accepts only the amount of fuel required to keep the float chamber full, and the excess fuel is forced to remain in pump chamber 2.

On the next ascent of push rod 10, the amount of movement which it will impart to lever 8 depends upon the amount of reverse movement lever 8 has undergone due to the feeding of fuel to the engine by the pump. Thus the cycle of movement of push rod 10 may be considered as divided into two fractions, one of which is effective on the pump and the other of which is ineffective on the pump; and the relative magnitude of these two fractions depends upon the amount of fuel fed per pump stroke. In any one car gear (e. g., high gear) the pump makes a fixed number of strokes per mile, so the amount of fuel fed per pump stroke is directly proportional to the rate of fuel consumption in gallons per mile. Also the amount of fuel fed per pump stroke is inversely proportional to the rate of fuel consumption in terms of miles per gallon.

In actual car operation the fuel pump makes quite a number of strokes each second. Accordingly an indicator which is automatically positioned in accordance with the running division of the pump-drive cycle into effective and ineffective fractions, may be supplied with a cooperating scale calibrated directly in either gallons per mile or miles per gallon.

In Fig. I a hook-up is shown diagrammatically for impressing upon a suitable meter 20 a resultant energization which is in accordance with the division of the pump-drive cycle into fractions which are effective and ineffective on the pump. The meter circuit is closed during the effective fraction of the pump-drive cycle and open during the ineffective fraction; and the natural period and damping of the meter are such that it does not follow the individual pulses, but is deflected in accordance with the resultant energization. Upon a change in the rate of fuel consumption (as by the car passing from a level road to an upgrade) the circuit is closed for a different fraction of the cam cycle, thereby changing the resultant meter energization and causing the meter to assume a correspondingly changed deflection.

The meter 20 is energized by a battery 21. If the meter is of conventional type and the absolute values (as opposed to the relative values) of the meter deflections are to be correct, the voltage impressed upon the circuit must be the standard voltage for which the system is calibrated. When the invention is applied to an automobile, it is convenient to use the car storage battery as the source of voltage; and since the voltage of this battery varies with the state of charge, a potentiometer 22 is connected across the battery to permit adjustment of the voltage applied to the meter circuit. One terminal of the car battery is usually "grounded" to the frame of the car. In Fig. I the circuit runs from ground at 23, battery 21 and potentiometer 22, switch 24, meter 20, switch 32, contact $p$, flexible connection 26, insulated segment 27, lever 8, and back to ground which is designated at 28. Thus with switch 24 closed, voltage will be impressed upon the meter during the intervals when gap 14 is closed. Means, indicated as a spring 29, are used to take out lost motion and back-lash, so that gap 14 will be closed only while diaphragm 3 is being pulled downwardly. Of course, spring 29 is so weak as to not interfere with the pumping of fuel by spring 4. A condenser 30 may be used if necessary to diminish sparking at gap 14, but if used its value should be kept within limits which will not introduce objectionable errors.

Each time gap 14 opens, the pump (and cam 11) are in the same position, e. g. in the position in which the high spot of the cam (intersected by line B) passes the push rod 10. Suppose the gap 14 closes when push rod 10 is engaged by the point on cam 11 which is intersected by line A, the position of line A varying with amount of fuel fed per stroke of the pump. Then the meter is energized for such proportion of the total time as angle $\alpha$ bears to 360 degrees. Angle $\alpha$ is less than 360 degrees; and probably most systems would be so designed that angle $\alpha$ would not exceed 120 degrees during the normal engine operation which was intended to be within the range of the meter. With such a design of apparatus, the meter circuit would be closed a maximum of one-third of the time. If six volts be selected as the standard peak voltage to be applied to the circuit, the maximum resultant, or integrated, voltage applied to meter 20 under operating conditions would then be two volts. Thus for greatest readability, the meter 20 should be one which would give full scale deflection if two volts were continuously applied to it; in other words, the meter would be what is ordinarily called a two-volt instrument. Should the engine stop with gap 14 closed, the full six volts would be continuously applied to the meter; and hence the meter should be designed to stand this voltage without injury, even though it be nominally a two volt instrument. However, by mechanically coordinating switch 24 with the ignition switch 31, the meter circuit will be opened (independently of gap 14) when the engine is shut down.

For many purposes, the relative fuel consumption rates are all that are needed; and at any one battery voltage meter 20 will show the relative fuel consumption rates, without adjustment of the applied voltage to a standard value. However, the meter 20 may also be used to adjust the applied voltage to the standard value when it is desired to take a reading that is correct in absolute value. This can be done by temporarily shifting switch 32 from contact p to contact q, which places multiplying resistance 33 in series with meter 20 to convert it into a voltmeter of suitable range. For example, if meter 20 be a two volt instrument and the standard circuit voltage is six volts, resistance 33 may be the value required to convert the galvanometer into a six volt instrument. In this case adjustment of the applied voltage to six volts would be made by shifting switch 32 to contact q, and then adjusting potentiometer 22 until the meter gave full scale deflection, after which the switch 32 would again be returned to contact p.

The system may be calibrated in any suitable terms, e. g., meter 20 may be given a scale reading directly in either miles per gallon or gallons per mile. If the meter has the conventional left-to-right movement, a gallons per mile scale will progress from left-to-right, with the hook-up of Fig. I. Correspondingly, a miles per gallon scale will progress from right to left; but if a left-to-right miles per gallon be desired, the meter can be mounted or constructed to electrically zero on the right hand side.

The shape of cam 11 affects the scale and calibration of the meter, since the meter circuit is closed while diaphragm 3 is being pulled down, and a given diaphragm movement may be effected by various angles of cam movement depending upon the cam gradient. Accordingly, the cam may be given a gradient which promotes the readability of the meter and facilitates a uniform scale in the terms selected (e. g. miles per gallon or gallons per mile). A uniform scale may also be facilitated by the construction of the meter itself in ways known to meter manufacturers.

For maximum readability of the meter, the normal working range of the pump should be spread over as large a proportion of the cam as possible. In this connection see the cam diagram of Fig. II. The high spot of the cam is on line B. If a miles per gallon scale is to be used and the poorest mileage which the system is designed to measure be five miles per gallon, the cam rise from A to B would correspond to the pump stroke required to pump one fifth of a gallon per mile. This rise is too small to show to advantage on the drawings. The pump needs excess capacity, however, for unusual conditions, such as for filling the pump after it has been drained. This excess capacity may be compressed into a quick-use cam sector θ, the action of which is beyond the range of the meter.

With the form of the invention so far discussed, the shape of the descending portion of the cam can be varied considerably as it does not affect the pump operation (the gap 14 being open). However, quick opening of the gap 14 may be insured by a steep descending cam gradient in zone D which immediately follows the high spot of the cam, or by an abrupt drop from the high spot with a cam-engaging nose on rod 10 which can take advantage of the drop. The first of these alternatives is shown in Fig. X where the zone D', which immediately follows the high spot at B, is one of steep descending gradient. The second of these alternatives is shown in Fig. XI where there is an abrupt drop at D'' and the push rod 10' has a nose 10a which can take advantage of the abrupt drop.

In Fig. III the reference characters of Fig. I are used so far as applicable. With this hook-up the energizing pulses delivered to meter 20 correspond to the intervals when gap 14 is open. Also the fuel rate measuring system may be automatically disabled at very low car speeds, thus eliminating certain difficulties in designing the apparatus for operation at these speeds at which the fuel consumption rate would ordinarily be of little or no interest. When a voltmeter type instrument is energized with a uniform series of individual direct-current impulses, there are three types of meter deflections that may result. The meter may (a) give individual deflections corresponding to the individual impulses, or (b) give a steady deflection that is a resultant of the individual impulses, or (c) never return to zero, but flutter in response to the individual impulses. For a given series of impulses, the natural period and damping of the meter determine whether (a), (b), or (c) will result. For best operation condition (b) is desired for the present invention; and known meter design is utilized to obtain it. If the meter were so designed as to be capable of giving condition (b) at very low car speeds, the meter would be relatively expensive and might also be rather sluggish at ordinary car speeds. In Figs. III and IV this design difficulty is avoided by limiting the operation of the meter to car speeds which are high enough to be of interest in normal driving.

The car generator 40 is provided (as usual) with a voltage relay 41 which effects and maintains connection between the generator and the battery 21 only when the generator voltage is as high as the battery voltage. This relay is shown with contacts 42 and 43 which are closed successively by the forward movement of armature 44, the first closing connecting up the generator 40 with the battery 21 and the second closing connecting up the meter circuit. With the relay in attracted position, potentiometer 22 is connected across generator 40 and battery 21 in parallel, one terminal being grounded. Circuit is then from the potentiometer, through resistance 46 and meter 20 to ground. Switch 47 is normally closed; and when gap 14 is closed the meter 20 is short circuited. Thus the meter is energized during the intervals when gap 14 is open, the resultant energization being in accordance with the division of the pump-drive cycle into effective and ineffective fractions.

To make a potentiometer adjustment, switch 47 is opened, whereupon the potentiometer voltage is continuously applied to the meter circuit. In this case, however, such large swings in battery voltage do not have to be contended with, as the system operates only when the battery is charging. The low speed disabling feature may be dispensed with by closing switch 48; and no excess voltage is applied to the meter if the engine stops with gap 14 closed, as that short-circuits the meter.

With the hook-up of Fig. III, a meter with conventional left-to-right movement will have a left-to-right miles per gallon scale. The meter characteristics should be adapted to this hook-up and a meter may be used having a full scale deflection (resistance 46 being included) corresponding to the standard circuit voltage selected. Suppression of the zero of the meter will increase the readability.

In Fig. IV, the meter is connected to be energized with pulses which are in one direction during the effective fractions of the pump-drive cycle and in the opposite direction during the ineffective fractions. Resistances 50, 51, 52 and 53 are arranged after the manner of a Wheatstone bridge, and the meter 20 receives the unbalanced current of the bridge. While measuring fuel consumption rate, switch 54 is closed; and when make-and-break 14 is open the bridge is unbalanced in one direction and when the make-and-break is closed the bridge is unbalanced in the other direction. Exceedingly wide variation in operating characteristics can be obtained depending upon the values and relative values of resistances 50, 51, 52 and 53, as will be apparent to those skilled in the design and operation of Wheatstone bridges. Switch 54, which is normally closed, may be temporarily opened to use meter 20 to adjust potentiometer 22.

The best way to obtain the desired characteristics of the bridge is to temporarily use variable resistances as the bridge arms, 50, 51, 52 and 53, and obtain the desired characteristics by actual trial. However, close approximations may be made by theoretical calculations although these are somewhat laborious. One illustration will be given by way of example, the bridge being calculated on a direct current basis, with the gap 14 first opened and then closed. With the gap 14 open, the voltage impressed upon meter 20 is one-eighth of that applied to the bridge by the potentiometer, and with the gap 14 closed, the voltage applied to the meter is minus three-eighths of that applied by the potentiometer when: resistance 50 is equal to one-thirty-second of the resistance of the meter, resistance 51 equal to twice the resistance of the meter, resistances 52 and 53 each equal to the resistance of the meter, and the resistance of potentiometer 22 is very small in comparison to the resistance of the meter.

The foregoing specific example of resistance values would be appropriate, where the meter was a one volt instrument, the standard voltage applied by the potentiometer 22 was eight volts, and the maximum value of α (Fig. II) was ninety degrees. When the fuel consumption rate was the highest, α would be a maximum and the meter would have one volt forward impressed upon it for three-fourths of the time, and three volts backwards impressed upon it one-fourth of the time; so the electrical reading of the meter would be zero. On the miles per gallon scale this would correspond to the lowest number of miles per gallon which the system was designed to measure. As the number of miles per gallon increased, α would decrease, and the meter would assume a deflection, thus bringing the needle to the point on the miles per gallon scale which corresponded to the higher number of miles per gallon.

By varying the values of the bridge arm resistances, a wide range of effects can be produced. The voltage of the positive and negative pulses applied to the meter may be made the same, or either one can be made stronger than the other, as best suits the equipment being designed and the scale to be used. It will be apparent that this bridge circuit may be used to, in effect, suppress the zero of the meter, thereby increasing its readability. It will also be apparent that the bridge circuit may be used to increase the sensitiveness of the system, due to the fact that a change in angle α affects the duration of both the positive and negative impulses, and the voltage of the positive and negative impulses may be made appropriately different to magnify the effect of an increment of change of angle α.

For accurate operation of the system as so far described in Figs. I, III and IV, constant volumetric efficiency of pump 1 is necessary; and 100 per cent volumetric efficiency would be desirable, though not necessary. However, it is difficult to arrange the present commercial fuel pumps to operate at constant volumetric efficiency, due presumably to the varying effect of the friction and inertia of the gasoline at different pump speeds. In this connection there is shown in Fig. V a construction that can be arranged to improve the volumetric efficiency of pump 1, both as to uniformity and the value of the efficiency itself. The fuel is drawn from the gasoline tank by a booster pump 1ª operating so out of phase with pump 1 that pump 1ª places the fuel in connection 56 under pressure during the intervals when the diaphram of pump 1 is descending. Of course, the strength of spring 4ª must be so adjusted to the line losses and the springs which, in actual practice, are associated with the check valves 16ª, 16 and 17 that the booster pump 1ª will not force fuel right through pump 1 to the carburetor.

In Fig. VI there is shown another pump construction which may be adapted to improve the volumetric efficiency of the pump, both as to uniformity and value. One factor which contributes to volumetric inefficiency and variations in efficiency is the inertia of the pipe full of gasoline from the tank. The present commercial pumps tend to arrest the movement of this column of liquid during the delivery strokes of the pumps, and lag may occur in getting the pipe full of fuel in motion again to fill the pump chamber during the suction strokes. In the construction of Fig. VI, however, means are provided to not only permit continued flow from the tank during the delivery strokes of the pump, but to also facilitate such flow.

The pump chamber 2' corresponds to the pump chamber 2 of Fig. I. The diaphragm 3' of impregnated cloth corresponds to the diaphragm 3 of Fig. I, the center portion of the diaphragm being clamped between opposing metal cups 60 and 61. Similarly spring 4' corresponds to spring 4 of Fig. I and the rod 6' corresponds to the rod 6 of Fig. I and is joined with the pump drive mechanism to which the meter is connected.

On the suction stroke of diaphragm 3', chamber 2' receives gasoline directly from an auxiliary pump chamber 62 through large ports and a large check valve 63. The check valve 63 is very light and is seated by a very light spring 64. On the suction stroke of diaphragm 3' fuel can flow readily from the chamber 62, because the top of the chamber is a flexible diaphragm 66 of impregnated cloth, the outer surface of which is exposed to atmospheric pressure.

On the delivery stroke of diaphragm 3' the column of gasoline coming from the gasoline tank is not arrested; and through its inertia the column can continue to flow into chamber 62, elevating diaphragm 66. Also, the diaphragm 66 may be (optionally) biased upwardly by a relatively light spring 67, thereby sucking gasoline from the tank during the delivery stroke of diaphragm 3'. Check valves 68 and 69 are provided as insurance against reverse flow. These are very light valves, lightly seated, and are preferably constructed in accordance with known fuel pump practice. Accordingly, the showing of these valves in the drawing is to be considered as diagrammatic. With all pump arrangements shown, the constancy of the volumetric efficiency of the pump can be enhanced by forming cam 11 with a dwell zone at the high part of the cam. This zone then throws a constant into the calibration of the meter system.

In Fig. VII there is shown a reversing switch for meter 20 which can be used in the circuits of Figs. I, III, and IV to cancel out the effect of imperfect or changing volumetric efficiency of the pump. The rotary reversing switch may be carried by, or built into, any suitable rotating part of the engine, e. g., it may be built into the distributor. Meter 20 is connected across brushes 80 and 81, and brushes 82 and 83 are connected to the circuit points to which the leads of meter 20 are shown connected in Figs. I, III, and IV. The reversing switch is so coordinated with cam 11 that the poling of the meter is reversed at the high spot of the cam and again 180 degrees from the high spot of the cam.

The action of the reversing switch will be discussed in connection with the circuit of Fig. I and it is believed that this illustrative discussion will make it clear to those skilled in the art that similar results may be produced with the reversing switch in the circuits in Figs. III and IV.

If the pump is operating at less than 100 percent volumetric efficiency, the down stroke of the pump (measured by angle $\alpha$, Fig. II) may be analyzed into two components, viz., the component which draws in fuel and the component which creates void. When the high spot of the cam is reached, there is nothing to prevent gap 14 from remaining closed because the fuel chamber 2 is not full. Accordingly, gap 14 will remain closed, with diaphragm 3 rising, until the void in pump chamber 2 has been eliminated. Thus, the gap 14 will remain closed during an angle $\beta$ (beyond the high spot of the cam) which corresponds to the portion of the suction stroke which created the void. With the reversing switch used in Fig. I, the meter is energized in one direction throughout angle $\alpha$, the angle corresponding to the fuel actually sucked in plus the void produced, in chamber 2. Then at the high spot of the cam, the poling of the meter is reversed and it is energized in the opposite direction throughout angle $\beta$, which corresponds to the void in chamber 2. Thus, the effect of the void in chamber 2 is cancelled out and the net energization of the meter is in accordance with the net suction of fuel by the pump.

When using the reversing switch it is necessary that the descending gradient of the cam in angle $\beta$ be the same as the ascending gradient of the cam in angle $\alpha$. This results in the cam being symmetrical about the line B. Furthermore, to correctly compensate for changing volumetric efficiency of the pump, the cam gradient must be uniform through the working range of angles $\alpha$ and $\beta$, i. e. the rise of the cam for each degree of rotation in angle $\alpha$ must be a constant, and similarly the fall of the cam for each degree of rotation in angle $\beta$ must be the same constant.

The reversing switch eliminates the effect on the meter of volumetric inefficiency of the pump, whether such inefficiency be variable or constant. If the volumetric inefficiency be constant, it does not introduce error but merely injects a constant into the meter calibration. In some pumps, the diaphragm so reshapes itself upon the pressure of spring 4 being substituted for the tension of rod 6, as to introduce an objectionably large constant into the meter calibration. Accordingly, it is often desirable to use the reversing switch to eliminate this constant from the meter calibration, regardless of eliminating errors due to changing volumetric efficiency.

It may be noted too that, in general, the reversing switch reduces the effective energization of the meter per cam revolution. Accordingly the meter used with the reversing switch should have the sensitiveness appropriate to give the desired readability with the reduced energization. Also where the reversing switch is used, the meter must be of a direct current type, i. e. one which is oppositely influenced by positive and negative impulses. In Figs. I and III, the meter may be either alternating current type or direct current type if the reversing switch is not used. In Fig. IV the meter must be of direct current type, regardless of whether the reversing switch is used.

Fig. IX shows the circuit of Fig. IV, the pump arrangement of Fig. V, and the reversing switch of Fig. VII, all electrically connected in operative relationship. In this figure the circuit arrangement which includes resistances 50, 51, 52, 53, 22, relay 41, and battery 21 is the same as in Fig. IV. Shaft 11 (with its cams) and the parts above it are the same as in Fig. V. The "Rotary Reversing Switch" and its meter 20 are the same as in Fig. VII. Wires 90 and 91 connect the gap 14 (duplicated from Fig. V) into the circuit containing resistances 50, 51, etc., so that the gap bears the same relationship to that circuit as is shown in Fig. IV itself. Wires 92 and 93 connect the reversing switch and meter 20 into the circuit containing resistances 50, 51 etc. so that the meter 20 bears the same relationship to that circuit as is shown in Fig. IV itself, but with the reversing switch electrically interposed as has been previously explained. The three organizations assembled in Fig. IX operate as already explained in connection with Figs. IV, V, and VII respectively. The reference characters from Figs. IV, V and VII have been carried into Fig. IX and there have the same significance as in such previous figures.

In Fig. VIII there is shown a compound differential meter which may be used for meter 20, instead of a conventional type of meter, which has so far been considered. This compound meter is, in substance, two electric meters so connected together that one compensates the other. Fixedly mounted on the same shaft 70 are two moving coil frames 71 and 72. Coil frame 71 is mounted in a permanent magnet field in the same manner as the usual D'Arsonval galvanometer type of volt meter. Coil frame 72 is mounted in an electro-magnetic field, (without permanent magnetization) the polarity of which is opposite to that of the permanent magnet field. Coil windings shown diagrammatically at 71a and 72a are connected in series, and leads are taken out through the hair springs 73 and 74 to terminals 76 and 77. The winding 75 of the electromagnetic field is connected to separate terminals 78 and 79.

The various windings are in such direction that when a direct current voltage is applied to the terminals in accordance with the polarity marked on the drawing, the turning moment of coil 71a is clockwise (looking down) and the turning moment of coil 72a is counter-clockwise. Thus, if terminals 76, 77 and 78, 79 receive their energy from the same ultimate source, a change in the voltage of that source will increase (or decrease) both the clockwise and counter-clockwise turning moments, thereby eliminating the effect of the voltage change to a large extent.

By proper adjustment of values, the effect of battery voltage changes can be so reduced that the potentiometer 22 and manual adjustment of the applied voltage to a standard value in Figs. I, III and IV may be eliminated. For example, suppose that the voltage of battery 21 varies from six volts to eight volts and that meter 20 is of the construction shown in Fig. VIII. The meter would then be calibrated (in miles per gallon, or the like) for the mean voltage of seven volts; and as to values, the meter could be so constructed and connected that with a seven volt battery the counter-clockwise turning moment of coil 72a would be equal to half of the clockwise turning moment of coil 71a. With such a set-up a battery voltage swing from six to eight volts will produce a maximum of only about two percent error in the reading of the meter. Thus, with the assumed values, the meter reduces the error of a total voltage swing of thirty-three percent to a meter error of only about two percent, which is well within the error permissible for speedometers, odometers, and other automotive measuring equipment.

In placing the meter of Fig. VIII in the circuits of Figs. I, III and IV, terminals 76 and 77 are connected to the circuit points to which meter 20 is shown connected. In comparison to the moving coils, winding 75 draws a heavy current and should be energized by a separate circuit. For example terminals 78 and 79 may be connected to be energized directly from the source of voltage, either with or without rheostat in series therewith. When the reversing switch is used, meter terminals 76 and 77 are connected to brushes 80 and 81, terminals 78 and 79 being connected as before. The reversing switch then reverses the current to the moving coils 71a and 72a but does not reverse the current in field winding 78.

It will be understood that as to structural details, appropriate known meter practice is to be used in constructing the meter of Fig. VIII. For example, stationary cores are usually placed within the moving coils to increase the field strength and make the field radial, but these have been omitted from the drawing for the sake of clarity.

In discussing the embodiments of the invention disclosed, various specific values of voltages, resistances, meter ranges, etc., have been mentioned to give concrete examples which would facilitate explanation of the invention. It will be understood, however, that the system should be designed for the particular automobile or other mechanism with which it is to be used, and that values of voltages, resistances, types of meters, meter ranges, cam shapes, etc. should be selected which will be advantageous for the particular system being designed.

It will also be understood that many forms of the invention are possible; and various adaptations of the specific disclosures are readily apparent. For example, instead of using the car battery with its attendant voltage problem, a separate battery may be used to energize the meter circuit. This circuit requires very little power and the separate battery may be a standard voltage battery and/or the voltage applied to the circuit may be adjusted with a series rheostat instead of a potentiometer. The low speed disabling feature shown in Figs. III and IV may obviously be used with the circuit of Fig. I. The contacts of make-and-break 14 may be suitable electric contact metal which will stand sparking. And, of course, the disclosures of specific forms of the invention are not to be taken as limiting the scope of the invention.

I claim:

1. For use in conjunction with an internal combustion engine: a variable stroke fuel pump in which a portion of the pump discharge stroke may be ineffective to feed fuel; an electric meter of the galvanometer type; and means to energize the meter in one direction in accordance with the magnitude of the entire pump discharge stroke and in the opposite direction in accordance with the magnitude of the ineffective portion of the pump discharge stroke, whereby the net energization of the meter is in accordance with the fuel feeding portion of the pump stroke.

2. For use in conjunction with an internal combustion engine: a device to give a running indication of the rate of fuel consumption of the engine; and means to automatically disable said device when the engine speed falls below a predetermined rate which is greater than zero, said means automatically restoring the operation of the device when the engine speed rises to a predetermined rate.

3. In a fuel feeding system for determining the gasoline consumption of an internal combustion engine: pumping means comprising two intermittently operable pumping chambers; means to actuate the pumping means synchronously but out of phase, the second pumping chamber receiving its fuel from the first pumping chamber; an electric meter; means to derive intermittent electrical impulses corresponding to the intermittent operation of said second pump chamber; and means to energize said meter with said electrical impulses to indicate the amount of fuel delivered by the second pumping chamber per cycle of operation thereof.

4. In an apparatus for measuring the rate of fuel consumption of an internal combustion engine, the fuel being fed to the engine by a variable displacement pump the displacement of which varies as the fuel requirements of the engine vary, and an electric meter being pulsatingly energized in accordance with the substantially concurrent pump displacement whereby variations in the rate of fuel consumption are substantially instantaneously indicated by corresponding variations in the meter reading; the improvement which comprises: a combined mechanical and electrical make-and-break, means mechanically connecting the make-and-break to the pump for actuation of the pump by the make-and-break, and means electrically connecting the make-and-break to the meter circuit for concurrent pulsating energization of the meter.

5. In an apparatus for measuring the rate of fuel consumption of an internal combustion engine, the fuel being fed to the engine by a variable displacement pump the displacement of which varies as the fuel requirements of the engine vary, and an electric meter being pulsatingly energized in accordance with the substanly concurrent pump displacement whereby variations in the rate of fuel consumption are substantially instantaneously indicated by corresponding variations in the meter reading; the improvement which comprises: a combined mechanical and electrical make-and-break, means mechanically connecting the make-and-break to the pump for actuation of the pump by the make-and-break, means electrically connecting the make-and-break to the meter circuit for concurrent pulsating energization of the meter, and means to automatically suspend the operation of the meter when the engine speed falls below a predetermined rate that is greater than zero.

6. In an apparatus for measuring the rate of fuel consumption of an internal combustion engine, the fuel being fed to the engine by a variable displacement pump the displacement of which varies as the fuel requirements of the engine vary, and an electric meter being pulsatingly energized in accordance with the substantially concurrent pump displacement whereby variations in the rate of fuel consumption are substantially instantaneously indicated by corresponding variations in the meter reading; the improvement which comprises: a combined mechanical and electrical make-and-break, means mechanically connecting the make-and-break to the pump for actuation of the pump by the make-and-break, and means electrically connecting the make-and-break to the meter circuit for concurrent pulsating energization of the meter, the meter being of a direct current type and the meter circuit including means to energize the meter in one direction when the make-and-break is open and in the opposite direction when the make-and-break is closed.

7. In an apparatus for measuring the rate of fuel consumption of an internal combustion engine, the fuel being fed to the engine by a cam-actuated variable displacement pump, the displacement of which varies as the fuel requirements of the engine vary, and an electric meter being pulsatingly energized in accordance with the substantially concurrent pump displacement whereby variations in the rate of fuel consumption are substantially instantaneously indicated by corresponding variations in the meter reading; the improvement which comprises: said cam having a sector of rise extending through approximately 180°, a major portion of said sector being an extended zone of small gradient occupying the latter port of the sector and corresponding to the range of pump displacements needed for normal variations in the engine fuel requirements, and a minor port of said sector being a quick-rise zone corresponding to the excess capacity of the pump and occupying the first part of the sector.

8. In an apparatus for measuring the rate of fuel consumption of an internal combustion engine, the fuel being fed to the engine by a cam-actuated variable displacement pump, the cam being driven in coordination with the engine, and the displacement of the pump varying as the fuel requirements of the engine vary, and an eletric meter being pulsatingly energized in accordance with the substantially concurrent pump displacement whereby variations in the rate of fuel consumption are substantially instantaneously indicated by corresponding variations in the meter reading; the improvement which comprises: a reversing switch automatically operated in coordination with the cam when the high spot of the cam is active and again 180 degrees therefrom, and circuit connections embodying the reversing switch in the meter circuit to cause the reversing switch to reverse the direction of energization of the meter.

9. In an apparatus for measuring the rate of fuel consumption of an internal combustion engine, the fuel being fed to the engine by a cam-actuated variable displacement pump, the cam being driven in coordination with the engine, and the displacement of the pump varying as the fuel requirements of the engine vary, and an electric meter being pulsatingly energized in accordance with the substantially concurrent pump displacement whereby variations in the rate of fuel consumption are substantially instantaneously indicated by corresponding variations in the meter reading; the improvement which comprises: a combined mechanical and electrical make-and-break, means mechanically connecting the make-and-break to the pump for actuation of the pump by the make-and-break, and means electrically connecting the make-and-break to the meter circuit for concurrent pulsating energization of the meter, the meter being of a direct current type and the meter circuit including means to reverse the direction of the meter energization on both opening and closing of said make-and-break; a reversing switch automatically operated in coordination with the cam when the high spot of the cam is active and again 180 degrees therefrom, and circuit connections embodying the reversing switch in the meter circuit to cause the reversing switch to also reverse the direction of energization of the meter.

10. An apparatus as in claim 7 in which the cam also has a rapid descent immediately following the high spot of the cam.

11. In an apparatus for measuring the rate of fuel consumption of an internal combustion engine, the fuel being fed to the engine by a cam-actuated variable displacement pump, the displacement of which varies as the fuel requirements of the engine vary, and an electric meter being pulsatingly energized in accordance with the substantially concurrent pump displacement whereby variations in the rate of fuel consumption are substantially instantaneously indicated by corresponding variations in the meter reading; the improvement which comprises: said cam having a sector of rise extending through approximately 180°, a minor portion of said sector being a quick rise zone occupying the first part of such sector.

12. In an apparatus for measuring the rate of fuel consumption of an internal combustion engine, the fuel being fed to the engine by a cam-actuated variable displacement pump, the displacement of which varies as the fuel requirements of the engine vary, and an electric meter being pulsatingly energized in accordance with the substantially concurrent pump displacement whereby variations in the rate of fuel consumption are substantially instantaneously indicated by corresponding variations in the meter reading; the improvement which comprises: said cam having an extended zone of small uniform gradient corresponding to the range of pump displacements needed for normal variations in the engine fuel requirements.

13. In an apparatus for measuring the rate of fuel consumption of an internal combustion engine, the fuel being fed to the engine by a cam-actuated variable displacement pump, the displacement of which varies as the fuel requirements of the engine vary, and an electric meter being pulsatingly energized in accordance with the substantially concurrent pump displacement whereby variations in the rate of fuel consumption are substantially instantaneously indicated by corresponding variations in the meter reading; the improvement which comprises: said cam having a zone of small gradient extending through at least a 90° sector of the cam and corresponding to the range of pump displacements needed for normal variations in the engine fuel requirements.

14. In an apparatus for measuring the rate of fuel consumption of an internal combustion engine, the fuel being fed to the engine by a variable displacement pump the displacement of which varies as the fuel requirements of the engine vary, an electric meter being pulsatingly energized in accordance with the substantially concurrent pump displacement whereby variations in the rate of fuel consumption are substantially instantaneously indicated by corresponding variations in the meter reading, the engine being equipped with a generator-and-storage battery system having an automatic relay operating to maintain the generator disconnected from the storage battery at low engine speeds and to maintain the generator connected to the storage battery at higher engine speeds, the improvement which comprises: a circuit to energize the meter from the generator-and-storage battery system, and means operating in conjunction with said relay to maintain said meter circuit when the generator is connected to the storage battery and to disconnect said meter circuit from both the generator and the battery when the generator is disconnected from the battery.

CHARLES F. CHISHOLM.